Nov. 29, 1932.                M. PETERS                1,889,320
                         PUSH BENCH MANDREL GUIDE
                           Filed May 1, 1930
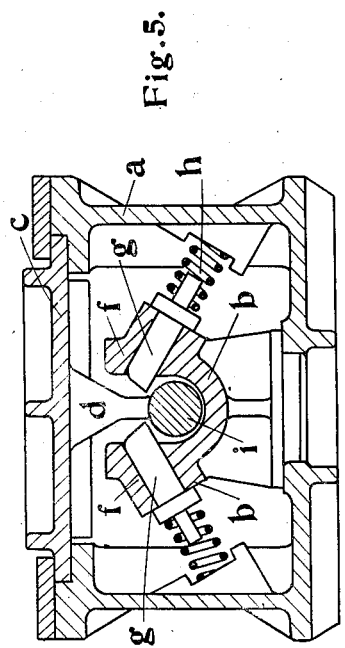
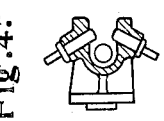
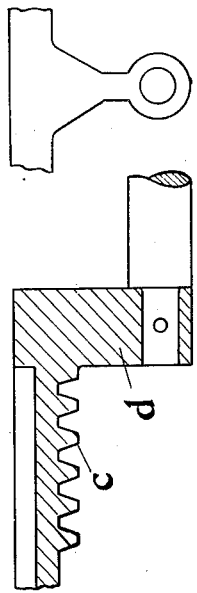
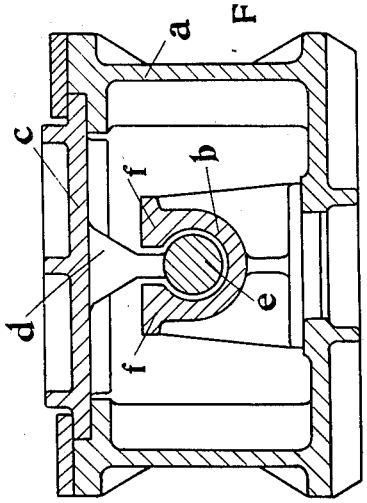
Inventor
M. Peters:
by
W. E. Evans
Attorney.

Patented Nov. 29, 1932

1,889,320

UNITED STATES PATENT OFFICE

MATHIAS PETERS, OF DUSSELDORF, GERMANY, ASSIGNOR TO DEMAG AKTIENGESELL-SCHAFT, OF DUISBURG, GERMANY

PUSH BENCH MANDREL GUIDE

Application filed May 1, 1930, Serial No. 448,922, and in Germany February 22, 1930.

In tube drawing benches the question of the guides for the mandrel and the mandrel shaft designed to prevent the risk of these parts snapping owing to the great axial thrust has developed into a very difficult problem. The present day tendency to operate at higher and higher speeds and to increase the length of the tubes (the lengthening of the tube necessitates also the lengthening of the mandrels and the mandrel shafts) makes the problem still more serious, as the known types of guide have a large number of defects.

According to the invention a stationary channel is provided with a slot at the top through which the operating arm passes and enters the channel, pushing the mandrel shaft and the mandrel in front of it. This ensures that the mandrel and the mandrel shaft shall be completely enclosed with the exception of the small opening formed by the slot, in other words that they are so guided that snapping or even bending is impossible as the opening is smaller than the diameter of the smallest shaft or mandrel.

According to the invention, moreover, to enable the mandrel (which is changed with each tube) to be readily introduced into the channel, the slot in the upper part of the channel, at the part where the mandrel is introduced and lies at rest, is widened and on each side movable elements are provided to extend into the slot for the retention of the mandrel shaft and mandrel within the channel, such movable elements being subjected to the action of springs, counterweights or other means for returning them to the normal position in which they extend into the slot after being pressed aside for the admission of the mandrel.

The invention is diagrammatically illustrated by way of example in the accompanying drawing.

Figure 1 shows the whole guide bed with the guide channel for the mandrel shaft.

Figures 2 and 3 illustrate detailed parts.

Figure 4 is a plan of the guide channel for the mandrel shaft and mandrel.

Figure 4a is a cross section of the guide channel for the mandrel shaft.

Figure 4b is a cross section of the channel for guiding the mandrel.

Figure 5 shows the guide bed with the guide channel for the mandrel.

In Figures 1 and 2 the guide bed is denoted by $a$ and the hollowed out guide channel by $b$; the latter is provided with a slot at the top through which the operating arm $d$ of the rack $c$ passes to enter the channel. The mandrel shaft $e$ lies in the guide channel $b$. The edges which form the slot are denoted by $f$. Figures 2 and 3 show the rack $c$ and the operating arm $d$. Figure 4 shows the guide channel $b$ for the mandrel shaft, Figure 4a being a cross section through the slotted part of the channel. The other part of the guide channel is adapted for the reception of the mandrel and Figure 4b is a cross section thereof. This guide channel for the mandrel $i$ is shown in detail in Figure 5, the guide bed being denoted by $a$. The guide channel $b$ has a slot at the top through which the operating arm $d$ of the rack slides through which the mandrel may be introduced. The jaws $g$ in the guide channel are bevelled off, the projecting edges on displacement of the jaws permitting passage of the mandrel. The apparatus works as follows:

While the drawing bench is operating the bevelled jaws $g$ are maintained effectively over the mandrel shaft under the action of the springs $h$ and prevent snapping or bending of the mandrel. When another mandrel is to be introduced it is fed into the guide channel $b$ by means of a mechanical chute or the like. It comes to rest on the bevelled jaws $g$ which it forces apart by its own weight. This brings it into the guide channel and the springs $h$ return the bevelled jaws into the working position. The jaws may be closed by other means such as counterweights or hand-operated levers which open and close the jaws on one or both sides.

I claim:

1. In tube drawing benches comprising a mandrel, mandrel shaft, operating rack and operating arm connecting said rack with the mandrel shaft, a guide consisting of a stationary channel of a cross-section approximating to that of the mandrel and mandrel shaft and having a narrow slot through which the operating arm enters the channel to move the mandrel and mandrel shaft, said narrow slot being formed of the full width of the channel at the position of introduction of the mandrel and mandrel shaft to allow them to be introduced into and removed from the guide, and movable elements disposed in positions transverse to the said full width slot and adapted to project into the slot for the retention of the mandrel and mandrel shaft, the said elements remaining undisturbed during the operation of the drawing bench.

2. In tube drawing benches comprising a mandrel, mandrel shaft, operating rack and operating arm connecting said rack with the mandrel shaft, a guide for the mandrel of a cross-section approximating to that of the mandrel and mandrel shaft and provided with a narrow longitudinal opening through which the operating arm may enter the guide to move the mandrel and mandrel shaft, the said opening being widened at the point of introduction of the mandrel and mandrel shaft to permit their introduction into and removal from the said guide, and movable elements disposed on opposite sides of the said widened opening and normally projecting therein to reduce the width of opening to the original width, the said elements being adjustable transversely to the opening on the introduction and removal of the mandrel and mandrel shaft, and remaining undisturbed during the operation of the drawing bench.

3. In tube drawing benches as set forth in claim 2, the provision of springs acting upon the said movable elements to maintain them normally in the forward position of adjustment to reduce the widened opening to the original width.

4. In tube drawing benches according to claim 2, the formation and disposition of the movable elements so that the inwardly protruding parts present inclined surfaces upon which mandrel and mandrel shaft may rest when being introduced into the guide and may by their own weight move the said elements.

5. In tube drawing benches comprising a mandrel, mandrel shaft, operating rack and operating arm connecting the said rack with the mandrel shaft, a guide for the mandrel and mandrel shaft of a cross-section approximating to that of the mandrel and mandrel shaft and provided with a narrow opening along the path of the operating arm, the said opening being widened at the position of introduction and removal of the mandrel and mandrel shaft from the guide, and movable elements disposed transversely to the said widened opening and normally projecting therein to a distance to reduce the width of opening approximately to that of the narrow opening, the said elements confining the mandrel and mandrel shaft while permitting unimpeded passage of the operating arm and being adjustable in position to permit the introduction into and removal from the guide of the mandrel and mandrel shaft.

MATHIAS PETERS.